US009311295B2

(12) United States Patent
Bohra

(10) Patent No.: US 9,311,295 B2
(45) Date of Patent: Apr. 12, 2016

(54) PROCEDURE EXTRACTION AND ENRICHMENT FROM UNSTRUCTURED TEXT USING NATURAL LANGUAGE PROCESSING (NLP) TECHNIQUES

(71) Applicant: International Business Machines Corporation, Armonk, NY (US)

(72) Inventor: Amit P. Bohra, Pune (IN)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 14/168,356

(22) Filed: Jan. 30, 2014

(65) Prior Publication Data

US 2015/0212994 A1  Jul. 30, 2015

(51) Int. Cl.
*G06F 17/27* (2006.01)

(52) U.S. Cl.
CPC ............ *G06F 17/2785* (2013.01); *G06F 17/27* (2013.01)

(58) Field of Classification Search
None
See application file for complete search history.

(56) References Cited

U.S. PATENT DOCUMENTS

| | | | |
|---|---|---|---|
| 6,928,425 B2 | 8/2005 | Grefenstette et al. | |
| 7,437,284 B1 | 10/2008 | Margulies | |
| 2005/0289456 A1* | 12/2005 | Bier | G06F 17/211 715/234 |
| 2007/0185837 A1* | 8/2007 | Gurcan | G06F 17/2247 |
| 2008/0027893 A1 | 1/2008 | Cavestro et al. | |
| 2008/0177740 A1 | 7/2008 | Novak | |
| 2010/0293136 A1* | 11/2010 | Watanabe | G06Q 10/06 707/608 |
| 2011/0055699 A1* | 3/2011 | Li | G06F 17/30864 715/709 |
| 2012/0089629 A1 | 4/2012 | Koll et al. | |

FOREIGN PATENT DOCUMENTS

EP  2624181 A1  8/2013

OTHER PUBLICATIONS

Ruiz-Casado et al., "From Wikipedia to Semantic Relationships: a Semi-automated Annotation Approach", Computer Science Department, Universidad Autonoma de Madrid, 28049 Madrid, Spain, This work has been sponsored by MEC, project No. TIN2005-06885.
Reynar, "An Automatic Method of Finding Topic Boundaries," Proceedings of the 32nd Annual Meeting on Association for Computational Linguistics (ACL '94), 1994, pp. 331-333.
Salton et al., "Automatic Text Structuring and Summarization," Information Processing & Management, Mar. 1997, pp. 193-207, vol. 33, Issue 2, Elsevier Ltd., Abstract Only, http://www.sciencedirect.com/science/article/pii/S0306457396000623, Accessed on Nov. 4, 2015.

* cited by examiner

*Primary Examiner* — Kavita Padmanabhan
*Assistant Examiner* — Ahmad M El-Bkaily
(74) *Attorney, Agent, or Firm* — Patricia B. Feighan

(57) ABSTRACT

A method for extraction and enrichment of a procedure from a document is provided. The method may include identifying a potential location of a procedure in the document. The method may also include detecting a beginning boundary and an end boundary associated with the identified potential location of the procedure. The method may further include validating a text associated with the identified potential location of the procedure in the document. Additionally, the method may include determining an intent from the identified potential location of the procedure based on at least one of the beginning boundary, the end boundary, a surrounding text associated with the identified potential location of the procedure, a context associated with the document, and a title of the document. The method may also include enriching the procedure based on the determined intent.

20 Claims, 4 Drawing Sheets

200

Example: Question Answering System

Question: How to manage multiple active chats?
202

Product User Guide

204 {

Simplify your desktop and more easily manage multiple active chats by consolidating them into a single tabbed window.

This feature is available for text chats with one or more chat partners. It is not available for the voice chat, video chat, or telephone conference call windows, if you have these features.

<u>View a demonstration of this task</u>

1. Click FILE> PREFERENCES and then click the plus sign (+) beside Sametime in the navigator.
2. Click Chat Window
3. Select Use tabbed window for multiple chats and then select whether you want your chat windows to display with horizontal or vertical tabs. If you select vertical tabs and you resize the width of these tabs, you can display on the tabs your chat partner's pictures, instead of their names.

Answer:

206 {

1. Click FILE> PREFERENCES and then click the plus sign (+) beside Sametime in the navigator.
2. Click Chat Window
3. Select Use tabbed window for multiple chats and then select whether you want your chat windows to display with horizontal or vertical tabs. If you select vertical tabs and you resize the width of these tabs, you can display on the tabs your chat partner's pictures, instead of their names.

FIG. 2

PROCEDURE EXTRACTION AND ENRICHMENT FROM UNSTRUCTURED TEXT USING NATURAL LANGUAGE PROCESSING (NLP) TECHNIQUES

FIELD OF THE INVENTION

The present invention relates generally to the field of computing, and more particularly to document extraction.

BACKGROUND

In various documents, there may be many cases where sentences and passages are part of a group and are not stand-alone. For example, many documents, such as product user guides, manuals, policy, how-to documents, installation guides and tutorials may contain procedures. The procedure text may include instructions, such as a series of steps to accomplish a task. Additionally, the procedure text may be structured in various formats. However, independent sentences and steps contained in the procedures may not make much sense and may often lose their complete meaning when the independent sentences and steps are examined separately from the entire procedure text. Current methods of text extraction may generate sentences and steps separately and therefore, the sentences and steps may not make much sense when examined in isolation. Furthermore, simply concatenating a portion of the text without identifying the procedure boundary may also not be beneficial.

SUMMARY

Therefore, according to some embodiments, in order to extract the complete meaning from the procedure text, the procedure text may, among other things, need to be examined as one logical unit of text.

A method for extraction and enrichment of a procedure from a document is provided. The method may include identifying a potential location of a procedure in the document. The method may also include detecting a beginning boundary and an end boundary associated with the identified potential location of the procedure. The method may further include validating a text associated with the identified potential location of the procedure in the document. Additionally, the method may include determining an intent from the identified potential location of the procedure based on at least one of the beginning boundary, the end boundary, a surrounding text associated with the identified potential location of the procedure, a context associated with the document, and a title of the document. The method may also include enriching the procedure based on the determined intent.

A computer system for extraction and enrichment of a procedure from a document is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include identifying a potential location of a procedure in the document. The method may also include detecting a beginning boundary and an end boundary associated with the identified potential location of the procedure. The method may further include validating a text associated with the identified potential location of the procedure in the document. Additionally, the method may include determining an intent from the identified potential location of the procedure based on at least one of the beginning boundary, the end boundary, a surrounding text associated with the identified potential location of the procedure, a context associated with the document, and a title of the document. The method may also include enriching the procedure based on the determined intent.

A computer program product for extraction and enrichment of a procedure from a document is provided. The computer program product may include one or more computer-readable storage devices and program instructions stored on at least one of the one or more tangible storage devices, the program instructions executable by a processor. The computer program product may include program instructions to identify a potential location of a procedure in the document. The computer program product may also include program instructions to detect a beginning boundary and an end boundary associated with the identified potential location of the procedure. The computer program product may further include program instructions to validate a text associated with the identified potential location of the procedure in the document. Additionally, the computer program product may include program instructions to determine an intent from the identified potential location of the procedure based on at least one of the beginning boundary, the end boundary, a surrounding text associated with the identified potential location of the procedure, a context associated with the document, and a title of the document. The computer program product may also include program instructions to enrich the procedure based on the determined intent.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2 illustrates an example of a question answering system according to at least one embodiment;

DETAILED DESCRIPTION

Figure 1:
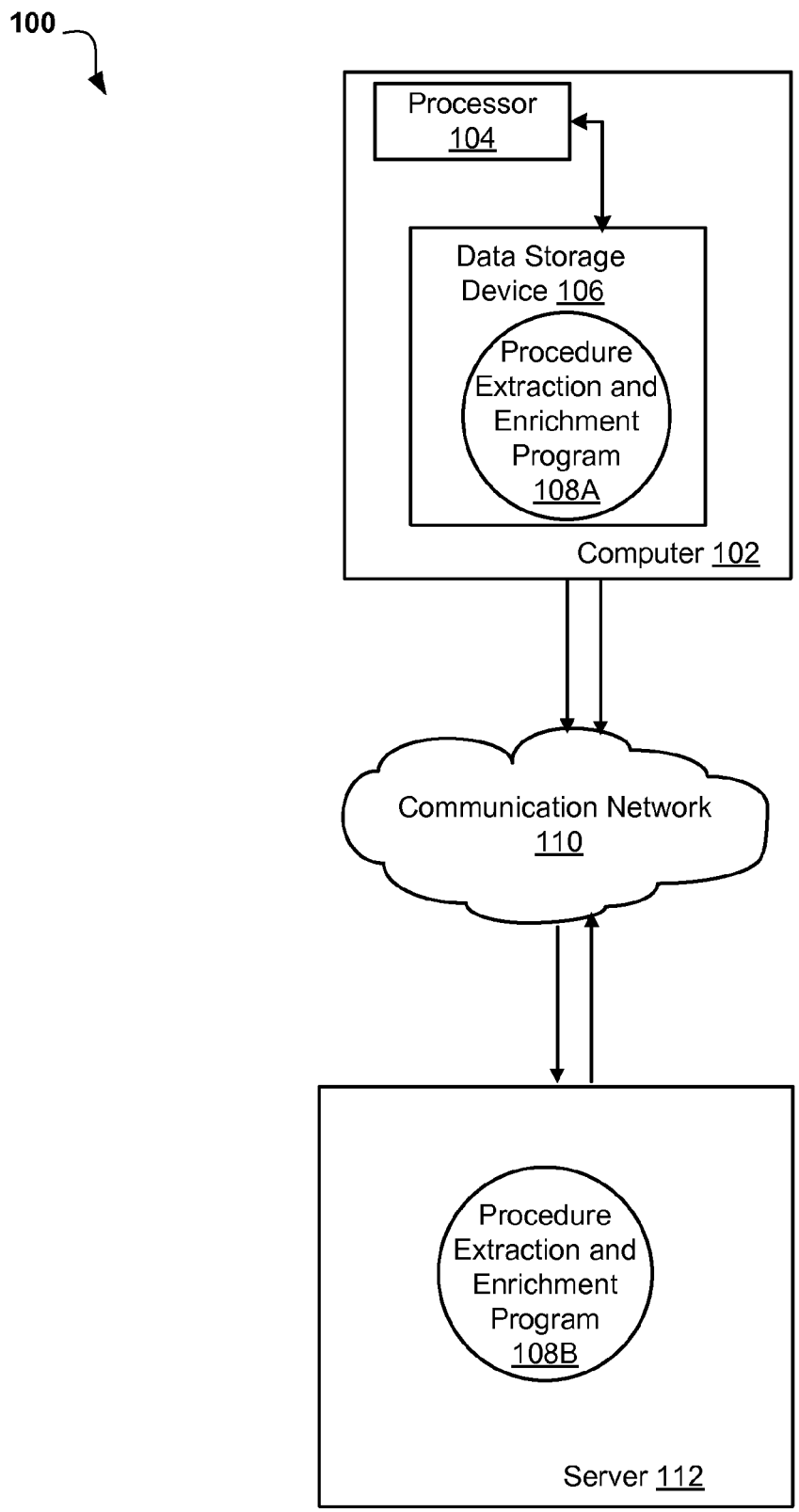
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to document extraction. The following described exemplary embodiments provide a system, method and program product for procedure extraction and enrichment from unstructured text using natural language processing (NLP) techniques.

As previously described with respect to text contained in various documents, there may be many cases where sentences and passages are not stand-alone and may not make much sense when the sentences and passages are taken out of context. For example, many documents, such as product user guides, manuals, policy, how to documents, installation guides and tutorials may contain instructions, such as steps or procedure text to accomplish a task. The independent sentences and steps contained in the procedures may not make much sense and may often lose their complete meaning when the independent sentences and steps are examined separately from the entire procedure text. However, current methods of text extraction may generate sentences and steps separately and therefore, the sentences and steps may not make much sense when examined in isolation. Furthermore, simply concatenating a portion of the text without identifying the procedure boundary may also not be beneficial. Additionally, a text converter may convert the procedures and steps into plain text. The plain text may contain a long list of words with little or no de-marking. As such, the text may make little sense when isolated from the original logical unit of text. Similarly, when a search is performed, a span of text relative to the tokens being matched may be returned. The span of text relative to the token may not make much sense to the user when taken out of context from the original logical unit of text. Therefore, in order to extract the complete meaning from the procedure text, the procedure text usually needs to be examined as one logical unit of text. Furthermore, current methods of text extraction may extract and separate the text from relevant figures, illustrations or examples that were displayed and related to the original logical unit of text. Therefore, the user may never receive such additional, useful information when current methods of text extraction are performed. As such, it may be advantageous, among other things, to provide structure and metadata to unstructured text.

According to at least one embodiment of the present invention, procedures, and steps contained in documents may be identified using various natural language processing (NLP) techniques and annotated with a purpose, such as describing what each step is meant for. In one embodiment, identification of the purpose may be implemented by looking at the span of text just before and after the procedure along with the passage or section that the procedure belongs to. Then, according to one implementation, the annotations and procedures may be enriched by linking the annotations and procedures to various parts of the document, such as illustrations, examples, and figures which may provide more information about the annotations and procedures. Furthermore, according to one implementation, the enrichment may also involve identification of multiple starting points and ending points in the procedure using various syntactic and semantic clues.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for procedure extraction and enrichment from unstructured text using natural language processing (NLP) techniques.

According to at least one implementation, multiple procedure identification from a document using a mixture of structural and semantic clues. Also, intent and purpose determination may be included for a particular procedure and the procedures may be enriched using various parts of the document globally. Additionally, identifying and creating relations between the procedure and other parts of the document may be included. As such, advantages of the present embodiments may include clearly demarking the procedures and steps in any unstructured document and enriching the procedures using various parts of the documents. Additionally, structure and relations may be provided to the procedures identified.

Embodiments of the present invention may not only detect boundaries between areas of different languages in a body of text or other input, but may annotate the procedure with the procedure's purpose and may enrich the procedure using various parts of the document. Furthermore, embodiments of the present invention may identify the purpose of the passage text and may enrich the text rather than merely summarizing the text.

Referring now to FIG. 1, an exemplary networked computer environment 100 in accordance with one embodiment is depicted. The networked computer environment 100 may include a computer 102 with a processor 104 and a data storage device 106 that is enabled to run a procedure extraction and enrichment program 108A. The networked computer environment 100 may also include a server 112 that is enabled to run a procedure extraction and enrichment program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800$a$ and external components 900$a$, respectively and client computer 102 may include internal components 800$b$ and external components 900$b$, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as a procedure extraction and enrichment program 108A and 108B may run on the client computer 102 or on the server computer 112. The procedure extraction and enrichment program 108A, 108B may be executed on unstructured text using natural language processing (NLP) techniques to identify and create relations between the procedure and other parts of the document. For example, a user using a procedure extraction and enrichment program 108A, running on a client computer 102 may connect via a communication network 110 to server computer 112 which may also be running a procedure extraction and enrichment program 108B. Furthermore, the user using client computer 102 or server 112 may utilize the procedure extraction and enrichment program 108A, 108B to provide structure and relations to the procedures identified. The procedure extraction and enrichment method is explained in further detail below with respect to FIG. 3.

Referring now to FIG. 2, an example of a question answering system according to at least one embodiment is depicted. According to at least one implementation of the present embodiment, procedures contained in documents may be extracted as one logical unit of text in order to retain the full meaning of the procedure. For example, a user may initiate a question asking, "How to manage multiple active chats" 202. A product user guide 204 may contain procedural steps 206 that explain how to manage multiple active chats. Current extraction tools may generate independent, single sentences or steps from the product user guide 204 which may not make sense when taken out of context and examined in isolation. Furthermore, simply concatenating a portion of the text without identifying the procedure boundary may also not be beneficial. For example, current extraction tools may extract and generate the sentence "Click Chat window" when the question "How to manage multiple active chats" 202 is asked. As such, an independent step, such as step #2, "Click chat window" from the product user guide 204 may not make sense when isolated from the entire procedure 206. Therefore, in order to extract the complete meaning from the product user guide 204, the procedure text 206 usually needs to be examined as one logical unit of text. For example, according to at least one implementation of the present invention, annotations and enrichments may be utilized to answer questions 202 which may result in an answer 206 that includes the complete steps 206 included in the product user guide 204.

Figure 3:
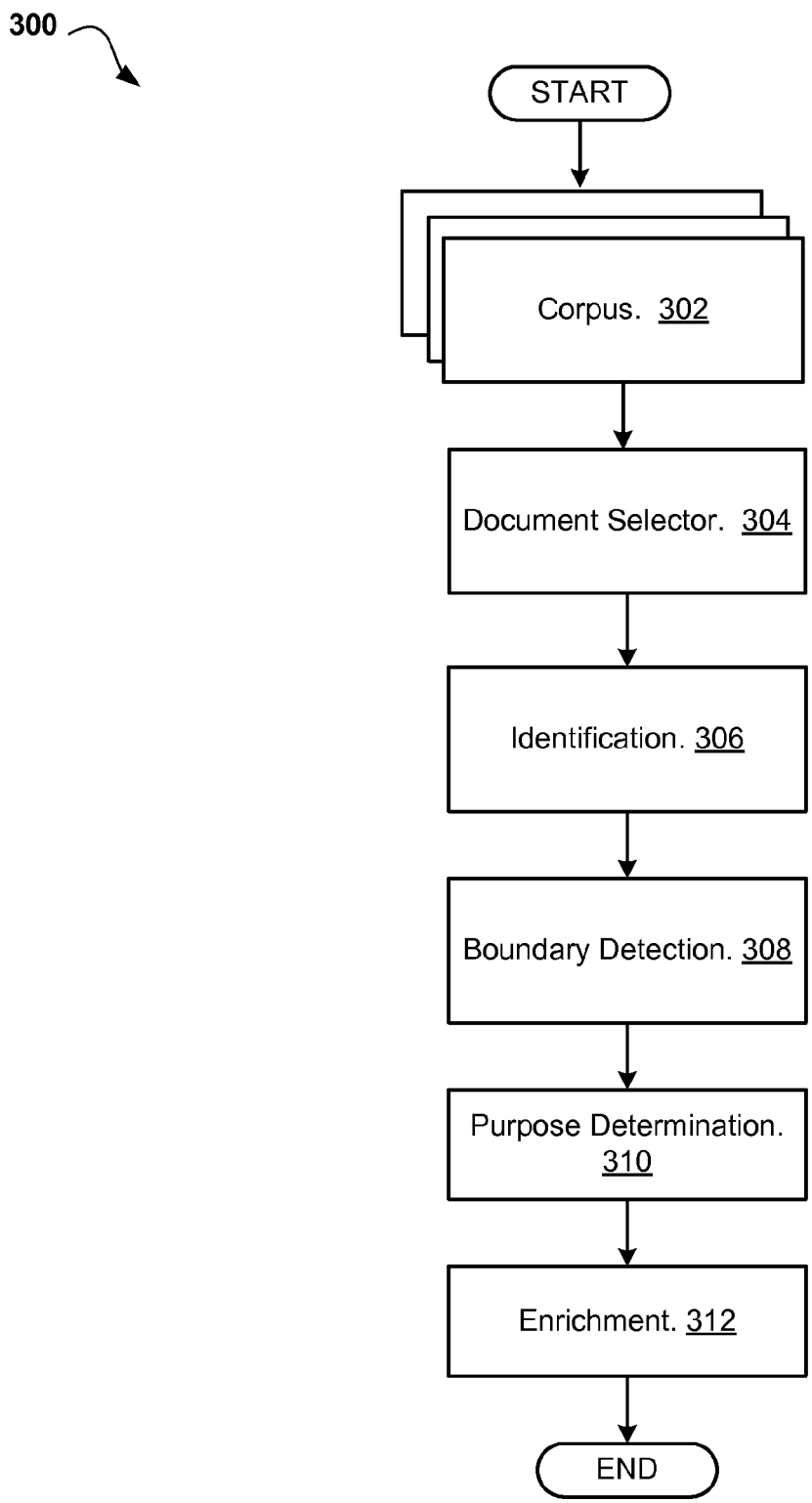
FIG. 3 is an operational flowchart illustrating the steps carried out by a program for procedure extraction and enrichment according to at least one embodiment.

Referring now to FIG. 3, an operational flowchart illustrating the steps carried out by a program for procedure extraction and enrichment according to at least one embodiment is depicted. For example, the procedure extraction and enrichment program 108A, 108B (FIG. 1) may be implemented as running on a client computer 102 (FIG. 1) or server computer 112 (FIG. 1). A user using client computer 102 (FIG. 1) or server computer 112 (FIG. 1) may execute the procedure extraction and enrichment program 108A, 108B (FIG. 1). According to at least one implementation of the present embodiment, a system may be built using a machine learning module which may be trained using various documents, containing procedures in various shapes and formats. The implementation for the steps in identifying, detecting and enriching the procedures are described in more detail below.

With respect to FIG. 3 at 302, a set of end documents may be collected to form a corpus. Then at 304, a single document may be selected from the corpus as input. As such, according to one implementation, documents may be selected one by one from the corpus to be examined for procedural content and the location of such procedures within the document.

Next, at 306, the selected document for input is analyzed for identification of procedures. As such, potential locations within the selected document that contain a procedure may be identified. According to at least one implementation of the present embodiment, the identification process may include the use of structural, syntactic, and semantic clues. For example, the clues may take various forms including, but not limited to the presence of special characters, such as "→", ">", ":", etc. The clues may also take the form of text tiling, indentation including bullets, numbering, spaces between words, beginning of a new line, fonts, etc. Additionally, the clues may include the presence of tokens (i.e., keywords) such as "Goto", "Next", "Click", "Send", etc. According to one implementation, the tokens may be obtained from a domain dictionary which may be manually provided. The clues may include a list or series of imperative sentences or instructions which may be relatively short and consecutive. Furthermore, with respect to user manuals with figures and diagrams, the description of the figures, titles, etc. may be utilized as clues for identifying the presence of a procedure.

Then, at 308 the boundaries of a procedure is detected. As such, a beginning boundary and an end boundary associated with the identified potential location of the procedure may be detected. Therefore, the method may identify the start and end of the procedure block in the span of text selected by the previous step 306. The boundaries may be identified using various features and clues such as tiling which may include font, spaces between words, etc. For example, to identify a starting point for a procedure, tokens that are used to indicate a start of a procedure may be identified such as "follows", "refer below", etc. Similarly, to identify an end point of a procedure, special tokens that are used to indicate an end of a procedure may be identified such as "above procedure describes . . . ", "steps above help in . . . ", and features such as a change in the topic or context of a discussion. Therefore, by analyzing the extended passage (e.g., 2-3 sentences before and after the procedure) the start and end of the procedure may be identified via discourse parsing. Additionally, according to one implementation, the text associated with the identified potential location of the procedure in the document may be validated further to verify that the identified boundaries are correct and the identified text is in fact a procedure. As such, the text associated with the identified potential location of the procedure may be marked as a procedure. Otherwise the text associated with the identified potential location of the procedure may be discarded and not marked as a procedure. According to one implementation, the validation may be performed using supervised machine learning techniques which may use a model trained on a pre-classified training set.

Next, at 310 the purpose of the procedure determined. As such, an intent may be determined from the identified potential location of the procedure based on at least one of the beginning boundary, the end boundary, a surrounding text associated with the identified potential location of the procedure (i.e., by analyzing the extended passage which occurs before and after the boundaries), a context associated with the document, and a title of the document. A procedure may be preceded or followed by sentences or text that creates the context of the procedure and identifies the purpose and intent of the procedure. Therefore, according to one implementation, the sentences and span of text preceding and following the identified boundary of the procedure in conjunction with natural language processing (NLP) techniques may be analyzed to identify the tokens that reflect the purpose and intent of the procedure. For example, the presence of noun phrases, named entities, or tokens from a specialized domain dictionary may be identified and utilized to aid in determining the purpose and intent of the procedure. As such, the procedure may be annotated in accordance with the associated purpose and intent.

Then, at 312 the procedure may be enriched. As such, the procedure may be enriched based on the determined intent of the identified procedure. For example, a selected document that contains a procedure may also contain supplemental information, such as illustrations, examples, figures, etc. that may be related to the procedure. The supplemental information may be co-located with the procedure or the supplemental information may be located anywhere in the document. Therefore, according to one implementation, the tokens and their semantic relations inside the procedure may be searched globally across the document to identify supplemental information, such as a section, a hyperlink or a figure that is related to the procedure and link the identified supplemental information with the procedure.

Additionally, using text analysis and redirections, command entities present in the procedure text and figure description such as "Goto next step", may be identified. Also, the method may not only identify the start and end of a procedure, but may identify multiple paths in the document that lead to the same step in a procedure. Then the method may annotate the identified multiple paths that lead to the same step in a procedure accordingly. Furthermore, the method may determine the input/output relation of the multiple paths in the document that lead to the same step in a procedure. For example, the method may determine that since the output of step "X" goes to the input of step "Y", then "Y" cannot be performed before "X". Similarly, the method may determine that step "X" and step "Y", are to be performed in parallel and annotate the steps accordingly. According to at least one implementation, the determined relation between the steps may be stored inside a derived document or stored in a storage system, such as a database.

The enrichment and annotations added to the procedures or steps may be used by various applications in a variety of ways. For example, according to one embodiment, a search engine application may be implemented. As such, a logical block may be returned when some part or tokens of the procedure match and the correct span of text is identified using procedure boundary identification. Similarly, an indexing engine application may be implemented according to another embodiment. Therefore, indices may be created on the annotations, such as purpose, start or end delimiters, etc. Furthermore, according to another embodiment, a customer support application may be implemented. The customer support application may provide quick adaptation to new domains. For example, if a new model of a mobile device is available, then the customer support application may be used in conjunction with the user manuals of that particular mobile device model as input. As such, the procedures from the manual may be identified and may be used for training of customer support executives. Additionally, according to another embodiment, an automation engine may be implemented using start and end tags. The start and end tags may help in the identification of parallelization and optimization in automation engines of the procedure. Also, according to another embodiment, a question answering system may be implemented which may use the annotations and enrichments to answer questions. As such, the answer to a question may result in all relevant steps being displayed as a complete procedure after identifying the intent and purpose of the sentences below and above a search term.

Figure 4:
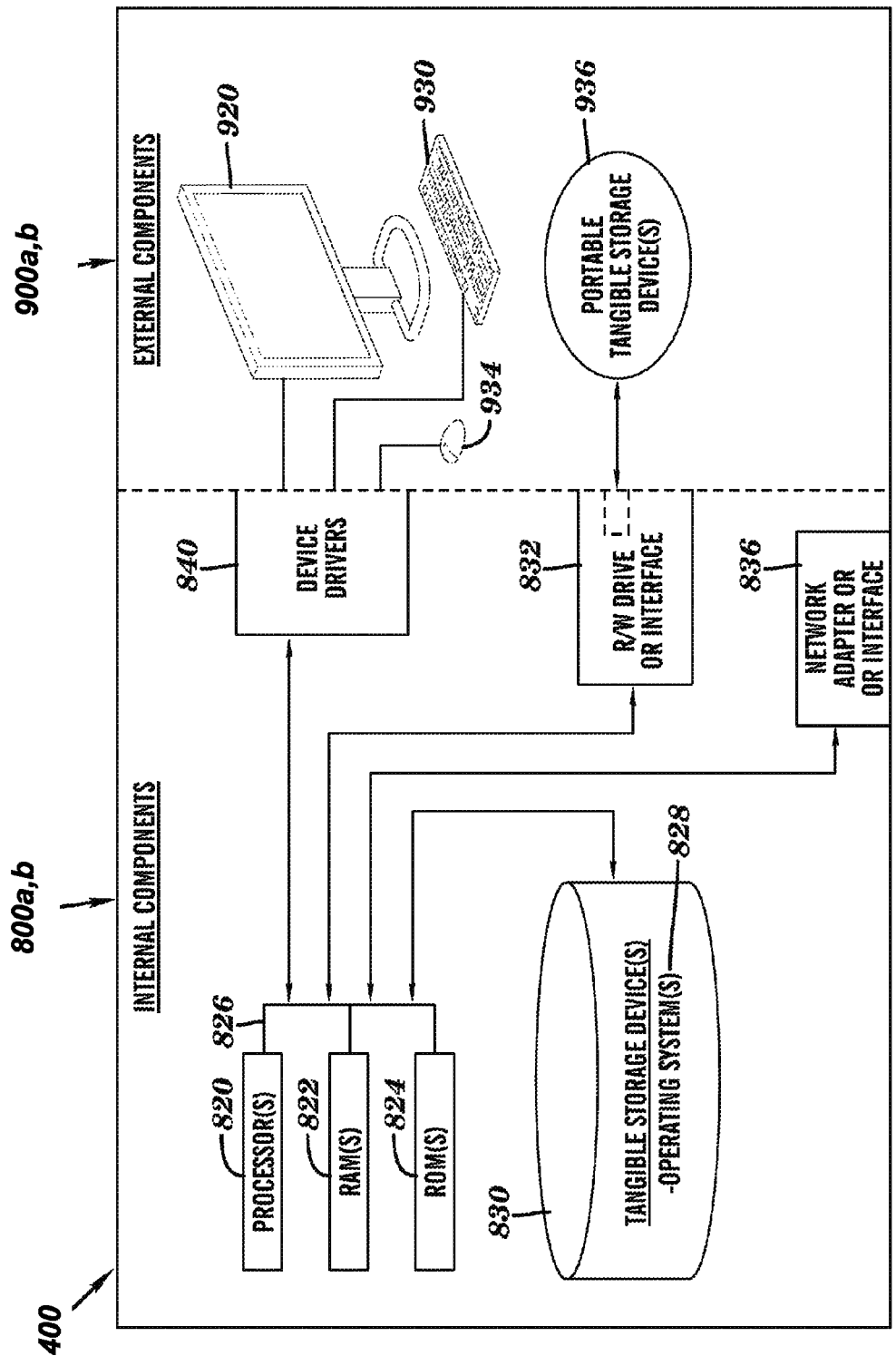
FIG. 4 is a block diagram of internal and external components of computers and servers depicted in FIG. 1 according to at least one embodiment.

FIG. 4 is a block diagram of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800a, b and external components 900a, b illustrated in FIG. 4. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and procedure extraction and enrichment program 108A (FIG. 1) in client computer 102 and procedure extraction and enrichment program 108B in network server computer 112 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as procedure extraction and enrichment program 108A and 108B, can be stored on one or more of the respective portable computer-readable tangible storage devices 936, read via the respective R/W drive or interface 832 and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The procedure extraction and enrichment program 108A in client computer 102 and procedure extraction and enrichment program 108B in network server 112 can be downloaded to client computer 102 from an external computer via a network (for example, the Internet, a local area network or other, wide area network) and respective network adapters or interfaces 836. From the network adapters or interfaces 836, the procedure extraction and enrichment program 108A in client computer 102 and the procedure extraction and enrichment program 108B in network server computer 112 are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for extraction and enrichment of a procedure from an unstructured text document, comprising: identifying a potential location of a procedure in the unstructured text document; detecting a beginning boundary and an end boundary associated with the identified potential location of the procedure; validating a text associated with the identified potential location of the procedure in the unstructured text document; determining an intent from the identified potential location of the procedure based on at least one of the beginning boundary, the end boundary, a surrounding text associated with the identified potential location of the procedure, a context associated with the unstructured text document, and a title of the unstructured text document; and enriching the procedure based on the determined intent; identifying a plurality of paths in the unstructured text document that lead to a same step in the procedure, wherein the identified plurality of paths are located outside the identified beginning boundary and the identified end boundary; and annotating the identified plurality of paths, wherein annotating the identified plurality of paths comprises determining an input/output relation of the identified plurality of paths and storing the determined input/output relation inside the unstructured text document and in a database.

2. The method of claim 1, wherein the identifying the potential location of the procedure in the unstructured text document comprises a use of at least one of a structural, a syntactic and a semantic clue.

3. The method of claim 2, wherein the structural, the syntactic, and the semantic clues comprise at least one of special characters, text tiling, indentation, bullets, numbering, a space between words, a beginning of a new line, a font, a presence of a token, a list of imperative sentences, a figure and a diagram.

4. The method of claim 1, wherein the validation of the text associated with the identified potential location of the procedure comprises at least one of a marking of the text associated with the identified location of the procedure or a discarding of the text associated with the identified location of the procedure.

5. The method of claim 1, wherein the determining the intent from the identified potential location of the procedure comprises analyzing at least one sentence preceding the detected beginning boundary and analyzing at least one sentence following the detected end boundary of the identified potential location of the procedure.

6. The method of claim 1, wherein the determining the intent from the identified potential location of the procedure comprises annotating the procedure with the determined intent.

7. The method of claim 1, wherein the enriching the procedure comprises an identification of supplemental information contained in the unstructured text document and a linkage of the identified supplemental information with the procedure.

8. A computer system for extraction and enrichment of a procedure from an unstructured text document, comprising: one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising: identifying a potential location of a procedure in the unstructured text document; detecting a beginning boundary and an end boundary associated with the identified potential location of the procedure; validating a text associated with the identified potential location of the procedure in the unstructured text document; determining an intent from the identified potential location of the procedure based on at least one of the beginning boundary, the end boundary, a surrounding text associated with the identified potential location of the procedure, a context associated with the unstructured text document, and a title of the unstructured text document; and enriching the procedure based on the determined intent; identifying a plurality of paths in the unstructured text document that lead to a same step in the procedure, wherein the identified plurality of paths are located outside the identified beginning boundary and the identified end boundary; and annotating the identified plurality of paths, wherein annotating the identified plurality of paths comprises determining an input/output relation of the identified plurality of paths and storing the determined input/output relation inside the unstructured text document and in a database.

9. The computer system of claim 8, wherein the identifying the potential location of the procedure in the unstructured text document comprises a use of at least one of a structural, a syntactic and a semantic clue.

10. The computer system of claim 9, wherein the structural, the syntactic, and the semantic clues comprise at least one of special characters, text tiling, indentation, bullets, numbering, a space between words, a beginning of a new line, a font, a presence of a token, a list of imperative sentences, a figure and a diagram.

11. The computer system of claim 8, wherein the validation of the text associated with the identified potential location of the procedure comprises at least one of a marking of the text associated with the identified location of the procedure or a discarding of the text associated with the identified location of the procedure.

12. The computer system of claim 8, wherein the determining the intent from the identified potential location of the procedure comprises analyzing at least one sentence preceding the detected beginning boundary and analyzing at least one sentence following the detected end boundary of the identified potential location of the procedure.

13. The computer system of claim 8, wherein the determining the intent from the identified potential location of the procedure comprises annotating the procedure with the determined intent.

14. The computer system of claim 8, wherein the enriching the procedure comprises an identification of supplemental information contained in the unstructured text document and a linkage of the identified supplemental information with the procedure.

15. A computer program product for extraction and enrichment of a procedure from an unstructured text document, comprising: one or more computer-readable storage devices and program instructions stored on at least one of the one or more tangible storage devices, the program instructions executable by a processor, the program instructions comprising: program instructions to identify a potential location of a procedure in the unstructured text document; program instructions to detect a beginning boundary and an end boundary associated with the identified potential location of the procedure; program instructions to validate a text associated with the identified potential location of the procedure in the unstructured text document; program instructions to determine an intent from the identified potential location of the procedure based on at least one of the beginning boundary, the end boundary, a surrounding text associated with the identified potential location of the procedure, a context associated with the unstructured text document, and a title of the unstructured text document; and program instructions to enrich the procedure based on the determined intent; program instructions to identify a plurality of paths in the unstructured text document that lead to a same step in the procedure, wherein the identified plurality of paths are located outside the identified beginning boundary and the identified end boundary; and program instructions to annotate the identified plurality of paths, wherein annotating the identified plurality of paths comprises determining an input/output relation of the identified plurality of paths and storing the determined input/output relation inside the unstructured text document and in a database.

16. The computer program product of claim 15, wherein the identifying the potential location of the procedure in the unstructured text document comprises a use of at least one of a structural, a syntactic and a semantic clue.

17. The computer program product of claim 16, wherein the structural, the syntactic, and the semantic clues comprise at least one of special characters, text tiling, indentation, bullets, numbering, a space between words, a beginning of a new line, a font, a presence of a token, a list of imperative sentences, a figure and a diagram.

18. The computer program product of claim 15, wherein the validation of the text associated with the identified potential location of the procedure comprises at least one of a marking of the text associated with the identified location of the procedure or a discarding of the text associated with the identified location of the procedure.

19. The computer program product of claim 15, wherein the determining the intent from the identified potential location of the procedure comprises analyzing at least one sentence preceding the detected beginning boundary and analyzing at least one sentence following the detected end boundary of the identified potential location of the procedure.

20. The computer program product of claim 15, wherein the determining the intent from the identified potential location of the procedure comprises annotating the procedure with the determined intent.

* * * * *